United States Patent
Hein et al.

(10) Patent No.: US 7,248,955 B2
(45) Date of Patent: Jul. 24, 2007

(54) VEHICLE ACCESSORY PROXIMITY SENSOR SLIDE SWITCH

(75) Inventors: David A. Hein, Sterling Heights, MI (US); Thomas Hicks, Livonia, MI (US); James A. Mulvihill, Royal Oak, MI (US); Lori A. Edwards, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 621 days.

(21) Appl. No.: 10/742,341

(22) Filed: Dec. 19, 2003

(65) Prior Publication Data
US 2005/0137765 A1   Jun. 23, 2005

(51) Int. Cl.
*G06F 7/00* (2006.01)
(52) U.S. Cl. ......................... 701/36; 307/10.1; 200/314
(58) Field of Classification Search ................. 701/36; 236/74 R, 78 B; 219/509, 635, 656; 307/10.1; 200/314
See application file for complete search history.

(56) References Cited

U.S. PATENT DOCUMENTS

| | | | | |
|---|---|---|---|---|
| 4,221,975 A * | 9/1980 | Ledniczki et al. | .......... | 307/116 |
| 5,250,930 A | 10/1993 | Yoshida et al. | | |
| 5,424,729 A | 6/1995 | Kishi et al. | | |
| 5,710,400 A | 1/1998 | Lorenz et al. | | |
| 5,784,531 A * | 7/1998 | Mann et al. | ................ | 392/494 |
| 5,861,583 A | 1/1999 | Schediwy et al. | | |
| 6,419,340 B1 * | 7/2002 | Wickham et al. | ............. | 347/15 |
| 6,737,596 B1 * | 5/2004 | Hein | .......................... | 200/310 |
| 6,822,204 B2 * | 11/2004 | Clothier | ...................... | 219/528 |
| 6,850,824 B2 * | 2/2005 | Breed | .......................... | 701/36 |
| 6,869,538 B2 * | 3/2005 | Yu et al. | ..................... | 210/742 |
| 7,050,897 B2 * | 5/2006 | Breed et al. | .................. | 701/46 |
| 7,065,435 B2 * | 6/2006 | Gorman et al. | ............... | 701/36 |
| 7,082,359 B2 * | 7/2006 | Breed | .......................... | 701/36 |

(Continued)

FOREIGN PATENT DOCUMENTS

DE   3932272 A   *   3/1990

(Continued)

OTHER PUBLICATIONS

A simple high efficient torque control for the electric vehicle induction machine drives without a shaft encoderAsaii, B.; Gosden, D.F.; Sathiakumar, S.;Power Electronics Specialists Conference, 1995. PESC '95 Record., 26th Annual IEEE vol. 2, Jun. 18-22, 1995 pp. 778-784 vol. 2.*

(Continued)

*Primary Examiner*—Cuong Nguyen
(74) *Attorney, Agent, or Firm*—MacMillan, Sobanski & Todd, LLC

(57) ABSTRACT

A method is provided for operating a proximity sensing unit for controlling an accessory device of a vehicle. A plurality of proximity sensors is disposed in a sequential pattern within a sensing unit whereby the proximity sensors are responsive to a manual activation. At least two activation signals are received from at least two proximity sensors in response to the manual activation. An activation sequence of at least two activation signals is determined. One of a plurality of control actions associated with the activation sequence is selected. A control action is initiated for controlling an operation of the accessory device.

10 Claims, 4 Drawing Sheets

U.S. PATENT DOCUMENTS

| | | | |
|---|---|---|---|
| 7,089,099 B2 * | 8/2006 | Shostak et al. | 701/32 |
| 7,138,727 B2 * | 11/2006 | Hein et al. | 307/9.1 |
| 7,162,332 B2 * | 1/2007 | Pillar et al. | 701/1 |
| 7,177,743 B2 * | 2/2007 | Roy | 701/36 |
| 2001/0004983 A1 * | 6/2001 | Wiezbowski | 219/667 |
| 2001/0029415 A1 * | 10/2001 | Flick | 701/36 |
| 2002/0044065 A1 * | 4/2002 | Quist et al. | 340/815.4 |
| 2003/0094354 A1 | 5/2003 | Badarneh | |
| 2004/0143380 A1 * | 7/2004 | Stam et al. | 701/36 |
| 2004/0230358 A1 * | 11/2004 | Stam et al. | 701/49 |
| 2004/0263494 A1 * | 12/2004 | Poor et al. | 345/204 |
| 2005/0141997 A1 * | 6/2005 | Rast | 416/229 R |
| 2005/0165527 A1 * | 7/2005 | Gorman et al. | 701/36 |
| 2005/0173419 A1 * | 8/2005 | Miller | 219/656 |
| 2005/0187689 A1 * | 8/2005 | Westerhoff | 701/49 |
| 2006/0261672 A1 * | 11/2006 | Richter | 307/10.1 |
| 2006/0279244 A1 * | 12/2006 | Rutkowski et al. | 318/471 |

FOREIGN PATENT DOCUMENTS

| | | | |
|---|---|---|---|
| EP | 442307 B1 | * | 6/1994 |
| ES | 2055460 T3 | * | 8/1994 |
| GB | 2223636 B | * | 9/1992 |
| JP | 57158171 A | * | 9/1982 |
| KR | 2003020513 A | * | 3/2003 |

OTHER PUBLICATIONS

Evaluation of Metal-Film Temperature and Velocity Sensors and the Stability of a Self-Propelled Research Vehicle for Making Measurements of Ocean Turbulence, Irish, J.; Nodland, W.;OCEANS vol. 10, Sep. 1978 pp. 180-187 □□.*

* cited by examiner

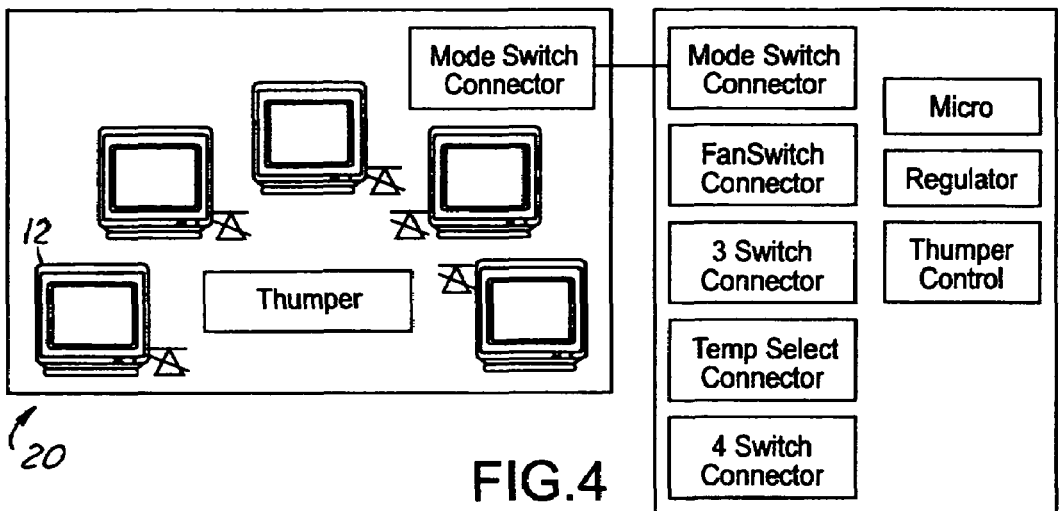

FIG.4

| Temperature Setting | | LED 6 Blue | LED 5 Blue | LED 4 Blue | LED 3 Red | LED2 Red | LED1 Red |
|---|---|---|---|---|---|---|---|
| Max cold Setting (Setting 1) | S1 | On | On | On | Off | Off | Off |
| Setting 2 | | Mid | On | On | Off | Off | Off |
| Setting 3 | S3 | Off | On | On | Off | Off | Off |
| Setting 4 | | Off | Mid | On | Off | Off | Off |
| Setting 5 | S5 | Off | Off | On | Off | Off | Off |
| Setting 6 | | Off | Off | Mid | Off | Off | Off |
| Setting 7 | | Off | Off | Off | Off | Off | Off |
| Setting 8 | | Off | Off | Off | Mid | Off | Off |
| Setting 9 | S9 | Off | Off | Off | On | Off | Off |
| Setting 10 | | Off | Off | Off | On | Mid | Off |
| Setting 11 | S11 | Off | Off | Off | On | On | Off |
| Setting 12 | | Off | Off | Off | On | On | Mid |
| Max Hot Setting (Setting 13) | S13 | Off | Off | Off | On | On | On |

FIG.6

| Condition | Result | Example |
|---|---|---|
| Sequential activation of switches | Enter Slide Mode | S1 -> S3 |
| Sequential activation using double activations | Enter Slide Mode | S3 & S5 -> S5 -> S5 & S9 |
| Sequential activation using double activation | Enter Slide Mode | S3 & S5 -> S5 -> S9 |
| Initial double activation followed by single activation | Do not enter Slide Mode | S9 & S11 -> S11 |
| Single activation followed by double activation | Do not enter Slide Mode | S3 -> S3 & S1 |

FIG.7

| Condition | Result | Example |
|---|---|---|
| Sequential incremental activation of switches | Increase by 2 temperature settings | S1 -> S3 -> S5 |
| Sequential incremental activation using double activations | Increase by 2 temperature settings | S3 -> S3 & S5 -> S5 -> S5 & S9 -> S9 |
| Initial double activation followed by single activation | Increase by 1 temperature settings | S9 & S11 -> S11 -> S13 |
| Initial double activation followed by double activation | Decrease by 1 temperaurte settings | S5 & S3 -> S3 -> S3 & S1 or S5 & S3 -> S3 -> S3 & S1 -> S1 |
| Incremental sequential activation, hold, and decreasing sequential activation | Increase by 1, hold, decrease by 1 | S5 -> S9 -> S9 -> S9 -> S5 |

FIG.8

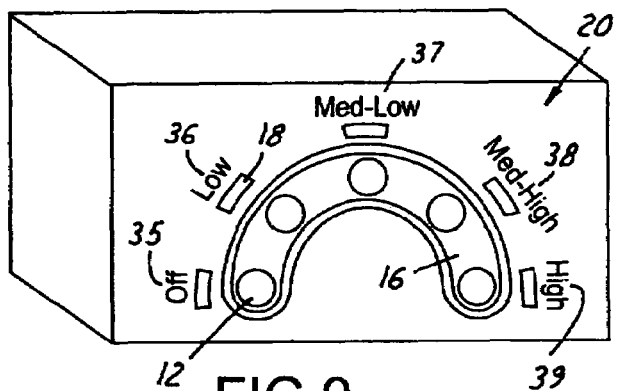

FIG.9

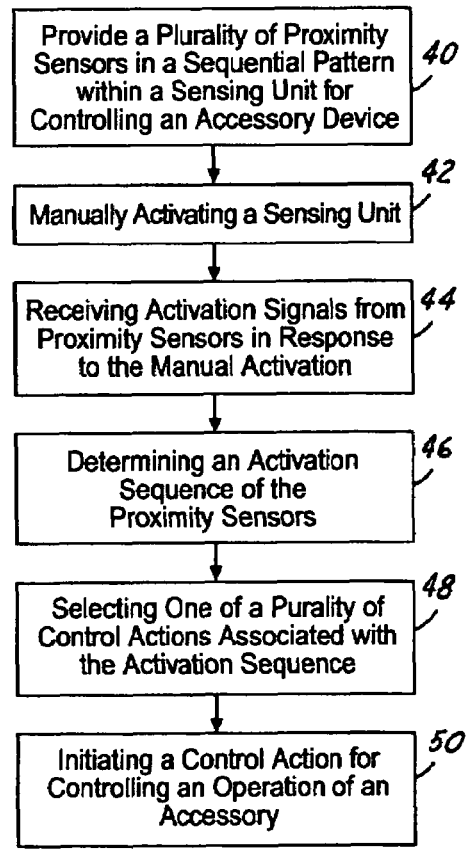

VEHICLE ACCESSORY PROXIMITY SENSOR SLIDE SWITCH

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a proximity sensor switch for operating a vehicle accessory, and more specifically, to a proximity sensor slide switch which uses nonmoving parts to operate a vehicle accessory.

2. Description of the Related Art

Vehicle accessory input controls typically consist of devices which require rotating a control knob, depressing a control button, or sliding a mechanical or electro-mechanical control switch to operate or adjust a vehicle accessory device. An exterior casing or oversize buttons and knobs are used to dress up and conceal the gaps between the bezel and the movable components of the input control devices. Despite the addition of these facial coverings to make the appearance presentable and visually appealing, the plurality of interlocking components leaves way for dirt and debris to lodge in the gaps and crevices between these interlocking components. This creates difficulty not only with respect to cleaning in these areas, but the potential exists to cause an interference condition. Covers, sealers, or boots may be used to seal and deter contaminants from entering these openings but these protector are require an additional cost to the vehicle manufactures which may be quite costly when multiple control input devices requires some type of protection device. Devices such as appliances have been known to use switches under the surface of a fascia of the appliance to create a sealed environment, however, these devices have been limited to a physical press and release operation, and furthermore, to increment or decrement a setting, the switch must be pressed and depressed multiple times or depressed and held for a certain duration of time.

Control input devices are typically manufactured from a plurality of cooperating subcomponents such as levers, rotating dials, and mechanical switches. As the number of interworking subcomponents increase for the assembly of a component, so do the potential failure modes and cost of the devices. This is the case for components that are moveable with respect to one another.

SUMMARY OF THE INVENTION

The present invention provides a method operating an accessory device of a vehicle using a proximity sensing device. A plurality of proximity sensors detect an object in close proximity to the proximity sensing unit and determines an activation sequence between at least two proximity sensors for controlling the accessory device.

In one aspect of the invention, a method is provided for operating a proximity sensing unit for controlling an accessory device of a vehicle. A plurality of proximity sensors is disposed in a sequential pattern within a sensing unit whereby the proximity sensors are responsive to a manual activation. At least two activation signals are received from at least two proximity sensors in response to the manual activation. An activation sequence of at least two activation signals is determined. One of a plurality of control actions associated with the activation sequence is selected. A control action is initiated for controlling an operation of the accessory device.

BRIEF DESCRIPTION OF THE DRAWINGS

FIG. 4 is an illustration of an accessory control architecture according to a second preferred embodiment of the present invention.

FIG. 6 is a table illustrating a plurality of temperature settings and associated LED illumination states.

FIG. 7 is a table illustrating conditions for entering a slide mode operation.

FIG. 8 is a table illustrating conditions for incrementing or decrementing a current temperature setting.

FIG. 9 is a perspective view of a five position rotary slide switch for a blower motor.

FIG. 10 is a method for controlling a vehicle accessory using a proximity sensing unit for the present invention.

DETAILED DESCRIPTION OF PREFERRED EMBODIMENTS

Figure 1:
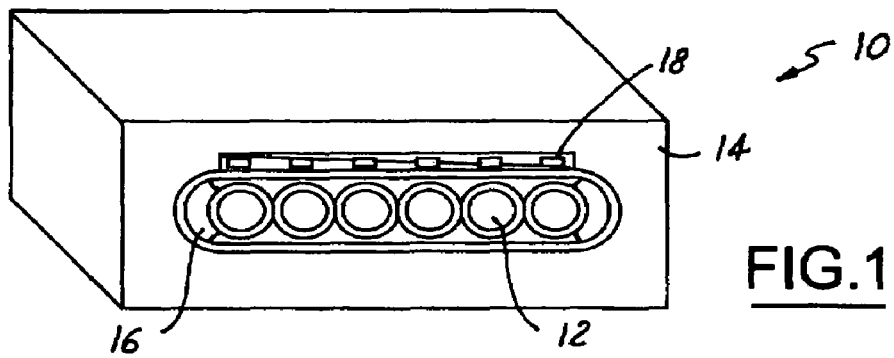
FIG. 1 is a perspective view of a proximity sensing unit for controlling a vehicle accessory according to a first preferred embodiment of the present invention.

Referring now to the Drawings and particularly to FIG. 1, there is shown a proximity sensing control unit 10 according to a first preferred embodiment. The proximity sensing control unit 10 is disposed within an instrument panel or trim panel of a vehicle interior for controlling the operation of a vehicle accessory such a temperature control device, blower motor, mode selector, or the like. A plurality of proximity sensors 12 is disposed inside of the proximity sensing control unit 10 under a surface of a bezel 14 and is directed toward the interior of the vehicle for sensing an object (e.g., finger) in close proximity to the proximity sensing control unit 10. In the preferred embodiment, the plurality of proximity sensors 12 comprises capacitance sensors. The capacitance sensors measure the change of capacitance of an area directly in front and in close proximity to a sensing portion of each capacitance sensor. As a result, the capacitance sensor is activated without having to actually contact the capacitance sensor. For example, the object needs only to be in close proximity to the capacitance sensor without having to contact the bezel 14 or fascia of the proximity sensing control unit 10. Since the capacitance sensors are mounted within the proximity sensing control unit 10 and can sense though the bezel 14, gaps and cut lines typically associated with mechanical switches, levels, buttons, dials, and control knobs are eliminated. This provides for an aesthetically pleasing appearance of an instrument or trim panel wherein the proximity sensing unit 10 is substantially inconspicuous.

The proximity sensing unit 10 may further comprise a groove 16 sunken into the surface of bezel 14 with the plurality of proximity sensors 12 disposed directly below a surface of groove 16. Since the plurality of proximity sensors 12 are non-visible and substantially inconspicuous, the groove 16 is a locator that indicates the location and directional arrangement of the plurality of proximity sensors 12 together with graphic indicators printed on bezel 14. This allows for the object to be directionally guided along the plurality of proximity sensors for controlling the operation of the vehicle accessory. A plurality of LEDs 18 is disposed in the same directional alignment as the plurality of proximity sensors 12. In the preferred embodiment, the plurality of LEDs 18 is disposed directly above the plurality of proximity sensors 12. Alternatively, the plurality of LEDs 18 may be disposed below the plurality of proximity sensors 12 or within the groove 16. The plurality of LEDs 18 indicates the current control setting of the vehicle accessory such as the current temperature setting for vehicle temperature control unit.

In the preferred embodiment of the present invention, the proximity sensing control unit 10 has more temperature settings than proximity sensors or LEDs such that ratio of temperature settings to proximity sensors or LEDs is greater than a 1:1 ratio. For example, the proximity sensing control unit 10 of FIG. 1 has six proximity sensors, six LEDs, and thirteen temperature settings. As a result, there is not a designated proximity sensor or LED for every temperature setting. Rather, the control sensing proximity unit 10 has two modes of operation for activating a specific temperature setting. A first mode of operation is a single press mode. When in single press mode, each of the plurality of proximity sensors 12 correlate to a specific temperature setting. However, since there are only six proximity sensors, only six temperature settings of the thirteen temperature settings may be activated by a single proximity sensor activation. This may be viewed as a coarse-mode of operation wherein a user can activate a temperature setting close to a desired temperature setting (if the desired temperature setting is not directly associated with the specific proximity sensor). A second mode of operation is a slide mode. When in the slide mode, the user can use two or more adjacent proximity sensors to slowly increment or decrement to the desired temperature setting. This may be viewed as a fine tune operation. An advantage when in slide mode is that a user can commence the slide mode operation at any of the plurality of proximity sensors 12 for slowly incrementing or decrementing from the current temperature setting. The advantage of incorporating the slide mode operation is that there can be a substantially less number of proximity sensors than temperature settings. If otherwise, a control unit would just have an abundance of proximity switches equal to the number of temperature settings, and as a result, the control unit would be overpopulated with a number of switches as well as an instrument panel if this type of control unit were used for multiple accessories. For the illumination of LEDs indicating the current temperature setting, since there are more temperature settings than LEDs, each LED will be illuminated alone or in combination using different illumination level outputs and colors to correlate to a specific temperature setting.

Figure 2:
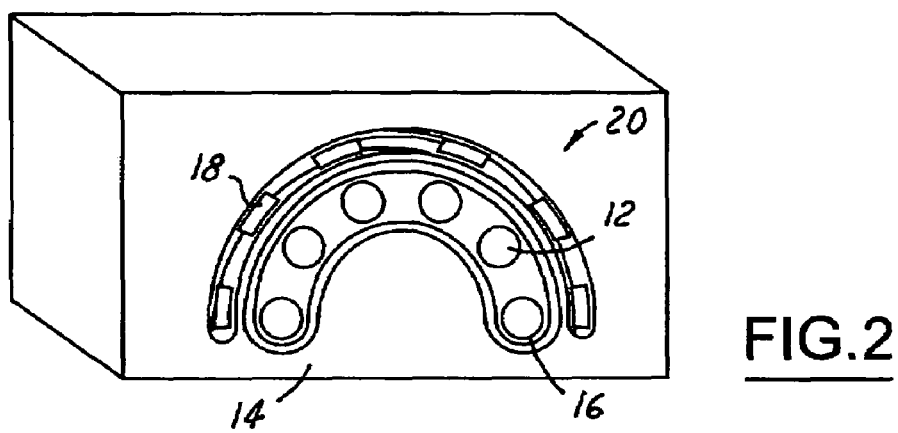
FIG. 2 is a perspective view of a proximity sensing unit for controlling a vehicle accessory according to a second preferred embodiment of the present invention.

FIG. 2 illustrates a second proximity sensing unit 20 according to a second preferred embodiment. The plurality of proximity sensors 12 and the groove 16 are disposed in an arcuate arrangement. This directional arcuate arrangement of the plurality of proximity sensors 12 and groove 16 provides the functionality of a dial or rotary control knob. The plurality of LEDs 18 is disposed radially outward from the plurality of proximity sensors 12 and groove 16 and also are disposed in an arcuate arrangement. Alternatively, the plurality of LEDs 18 may be disposed below the plurality of proximity sensors 12 or within the groove 16. In other preferred embodiments, the plurality of proximity sensors 12, groove 16, and plurality of LEDs 18 may be disposed vertically or in a serpentine directional arrangement.

Figure 3:
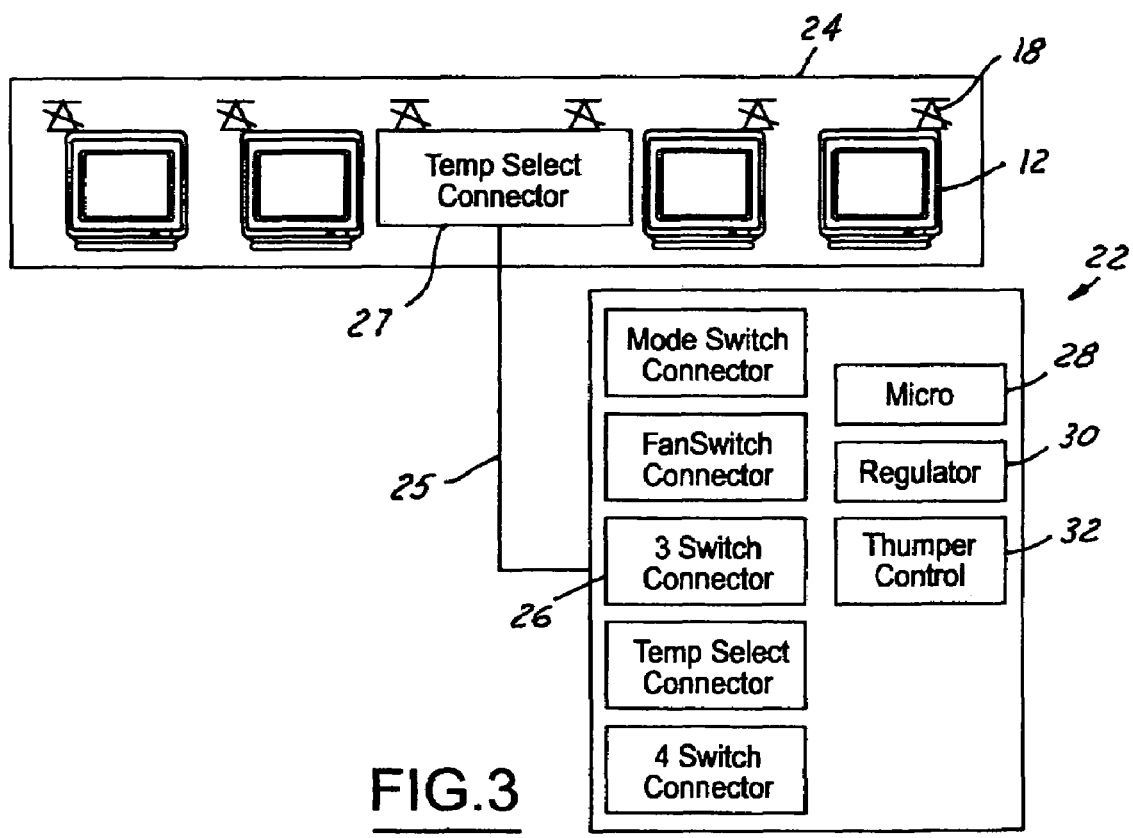
FIG. 3 is an illustration of an accessory control architecture according to a first preferred embodiment of the present invention.

FIG. 3 illustrates an accessory control architecture according to a first preferred embodiment of the present invention. The plurality of sensors 12 is horizontally aligned within a sensor control circuit board 24. The plurality of LEDs 18 is disposed horizontally above the plurality of sensors 12 on the sensor control circuit board 24. The sensor control circuit board comprises a sensor connector 27 for electrically attaching to a wire harness 25. The wire harness 25 electrically connects the sensor control circuit board to a controller 22. The controller 22 comprises at least one switch connector 26 for electrically attaching directly to the wire harness 25. The controller 22 includes a microprocessor 28 for receiving sensed signals from the plurality of proximity sensors 12 and for outputting control signals to the vehicle accessories. Alternatively, the controller 22 may be integrated within the sensor control circuit board 24, thereby alleviating the need for wire harnesses for electrically attaching the sensor control circuit board 24 and the controller 22. A regulator 30 is provided to maintain a constant voltage to the microprocessor 28 (e.g., 12 volts battery voltage to regulated 5 volts). A thumper 32 is a tactile or audible feedback signal which provides a user with notification that a request for a change in the current setting has been initiated. Unlike the use of a mechanical slide switch or a rotary knob where the user can visually see or feel the implemented manual control change, the use of proximity sensors by itself makes it difficult for the user to detect if a switch activation has occurred. To assist a driver in maintaining focus on the road as opposed to looking at the display of LEDs for verification of the change, a tactile feedback or audible feedback is provided to notify the driver that the request for the control setting change has been received. The tactile feedback may be utilized if the proximity sensors are touch-sensitive sensors wherein a vibration, pulse, or similar tactile response will be provided by the proximity control sensing unit 10. If proximity sensors such as capacitance sensors are used wherein actual contact with the proximity sensing device is not needed, then an audible response such a beep, tone, or the like may be used. Furthermore, different tones or tactile responses may be used to differentiate between an increase and a decrease in the control setting.

FIG. 4 illustrates a sensor architecture according to a second preferred embodiment. The plurality of sensors 12 is disposed in an arc-like arrangement. In this embodiment, the sensing control unit 20 comprises a mode selection wherein each sensor initiates a specific accessory function such as floor heating, window defrost, panel heating, or dual combination heating. In other embodiments, the sensing control unit may control a blower fan, wiper motor, interior lighting intensity, instrument panel lighting intensity, or other vehicle accessory.

Figure 5:
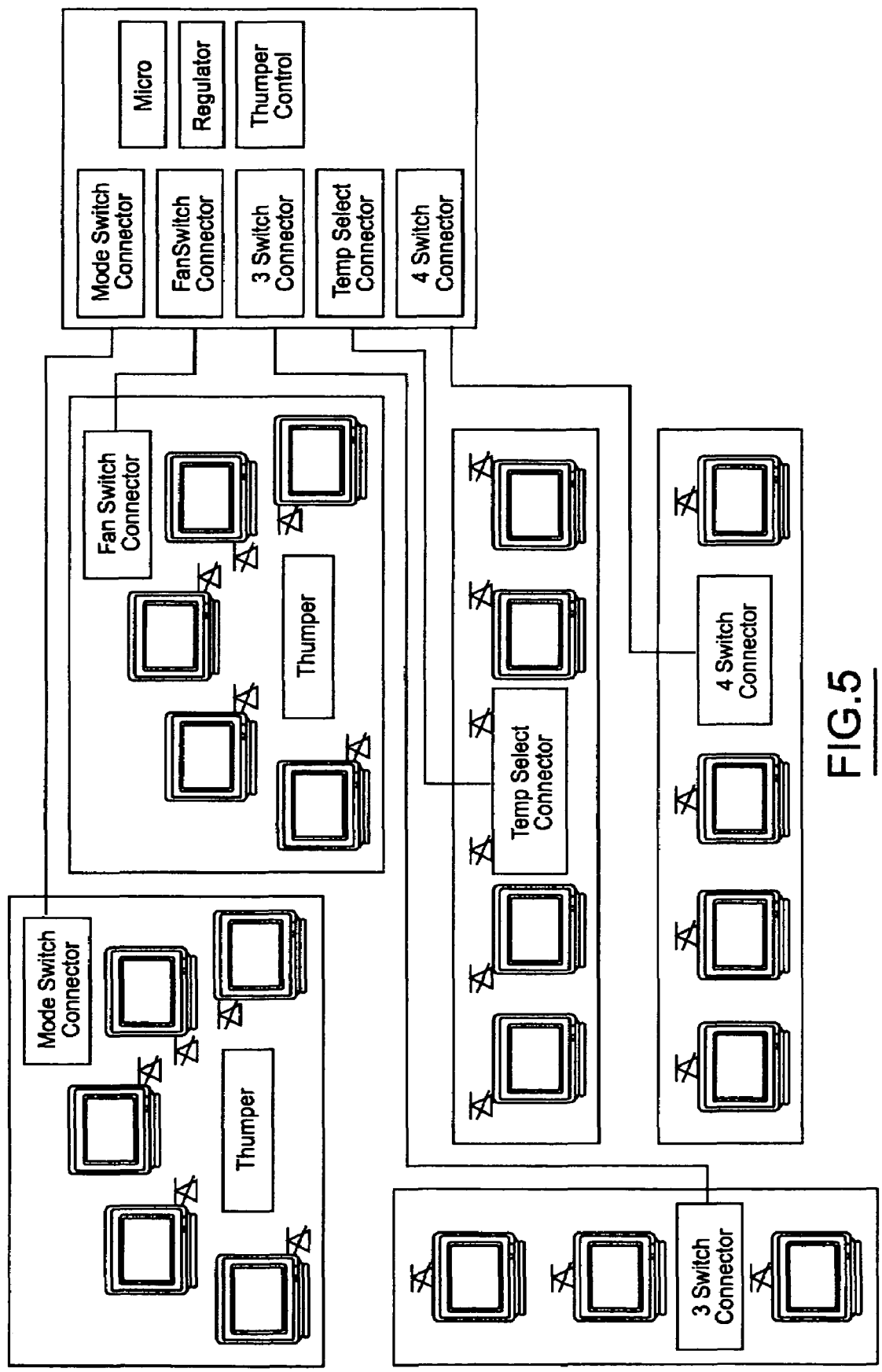
FIG. 5 is an illustration of an integrated accessory control architecture for controlling a plurality of vehicle accessories.

FIG. 5 illustrates an integrated sensor architecture for controlling a plurality of vehicle devices using a single controller. A plurality of proximity sensing units is disposed on a vehicle instrument panel. Alternatively, an individual proximity sensing unit may be disposed in other interior locations of the vehicle aside from the vehicle instrument panel such as a rear seat control unit for rear seat passenger control. Each of the plurality of proximity sensing units may comprise a respective number of proximity sensors and respective directional arrangement of proximity sensors. If each of the plurality of proximity sensing units is disposed in close proximity to one another, then the plurality of proximity sensing units may be disposed on a single circuit board. If at least one proximity sensing unit is distal from another proximity sensing unit where combining the plurality of proximity sensing units on a single circuit board is unfeasible, then the plurality of proximity sensing units will be disposed on at least two circuit boards and are each electrically connected via a respective wire harness to the controller. The controller comprises a respective wire harness connector for electrically attaching to each respective wire harness. A single microprocessor will receive each of the respective sensor signals and provide the appropriate output signal for controlling the vehicle accessories.

FIG. 6 illustrates a table of a plurality of temperature settings displaying an illumination state of each LED for each temperature control setting. In the preferred embodiment, there are thirteen temperature settings. The first temperature setting is the maximum cold setting and the thirteenth temperature setting is the maximum hot setting. For a respective temperature setting, each of the six LEDs will be in an ON state, an OFF state, or a MID state. The plurality of LEDs 18 functions as a temperature bar to indicate the current temperature setting. The first three LEDs are blue colored and the second three LEDs are red colored to illustrate cold to hot along the temperature bar. The ON state for a respective LED is achieved by 100% duty cycling using pulse width modulation (PWM). The OFF state is achieved by supplying zero voltage to the LED. The MID state or middle brightness level is achieved using a 50% duty cycle PWM at a frequency greater than 60 Hz. The MID state is used as a transition state from cold to hot indicative of a warm temperature setting. Each of the thirteen control temperature settings is distinguished from another by the combined illumination or non-illumination of the six LEDs as shown in FIG. 6.

When power is supplied to the proximity sensing unit, the switch position will default to a middle temperature setting represented by temperature setting S7 in which all LEDs are in an OFF state. To activate a desired temperature setting, a single press mode may be activated by activating one of the six LEDs. Activation occurs by either pressing or releasing a proximity sensor (i.e., touch-sensitive) or by holding an object such as a finger directly in front of a proximity sensor (i.e., non-touch capacitance sensor). This is a primary mode of operation and the temperature setting will immediately change to the selected temperature setting. When in the single press mode, temperature settings S1, S3, S5, S9, S11, and S13 are associated with proximity sensors 1-6 respectively. For example, activating the third proximity sensor S3 will activate temperature setting 3. An individual proximity sensor must be activated and released within a first predetermined period of time to activate the selected temperature setting. To activate any temperature setting not directly associated with a specific proximity sensor, the user may activate and release two adjacent proximity sensors at the same time. If no other proximity sensor is activated within the first predetermined period of time, then the temperature setting activated will be a setting between the two temperature settings associated with the two respective proximity sensors activated. For example, if S1 and S3 are activated and released simultaneously, then temperature setting 2 is activated. For simultaneous activation of two proximity sensors to occur, both proximity sensors become activated within a second predetermined period of time of each other. For simultaneous release of two proximity sensors to occur, both proximity sensors become activated within the second predetermined period of time of each other. If a selected proximity sensor is activated and held for more than a third predetermined period of time without release, then the temperature setting is changed to the associated temperature setting of the selected proximity sensor.

Following the initial power up and the default activation of temperature setting 7 or following the single press mode activation for the desired temperature setting, the slide mode activation may be entered. The slide mode operation detects the object sliding between at least two proximity sensors and determines the direction which the object has moved (i.e., hot to cold or cold to hot) and the number of sensors activated during the slide mode operation for increasing or decreasing the temperature settings. The slide mode operation increments or decrements temperature adjustment from the current temperature setting. The slide motion may commence anywhere along the proximity sensor arrangement. The direction that the object has moved determines whether the temperature setting should be incremented or decremented. Once the slide motion operation is activated, the slide mode operation will stay in slide mode until all proximity sensors remain off for a fourth predetermined period of time. While in slide mode, all single press mode operations are ignored.

FIG. 7 is a table illustrating conditions in which the slide mode operation may be entered. The slide mode operation is activated when a definitive displacement is made between two sensors or a definitive displacement is made between two sets of sensors. The table in FIG. 7 includes examples of a sequential activation for entering the slide mode operation including the use of at least one double activation. Double activation comprises an operation where an object is initially disposed between two proximity sensors or the object is subsequently moved between two proximity sensors thereby activating both proximity sensors simultaneously within a respective time period. The first table entry in FIG. 7 includes a first sequential activation where the object is placed over S1 and is subsequently moved to the S3. This operation places the proximity sensing control unit 10 in slide mode operation. The second table entry includes a second sequential operation using the double activation. The object is initially placed between S3 and S5 thereby activating both proximity sensors. The object is subsequently moved to S5 and then moved to a position between S5 and S9. The second activation also places the proximity sensing unit in slide mode operation. The fourth table entry includes an initial double activation followed by a single activation. The object is first placed between S9 and S11 thereby activating proximity sensors S9 and S11. The object is subsequently moved to S11. Since a definitive displacement is not made between at least two sensors or between two sets of sensors, the slide mode operation is not activated. In the fifth table entry, the object is moved to S3 and then moved between S3 and S1. Since a definitive displacement is also not made between two sensors or two sets of sensors, the slide mode operation is not activated.

FIG. 8 is a table illustrating conditions where the temperature setting is incremented or decremented by number of temperature settings based on the activation sequence. This includes examples of sequential activation of proximity sensors, single activation in combination with double activation, and double activation in combination with double activation. The number of proximity sensors activated during the slide mode operation determines the number of temperature settings that should be incremented or decremented from the current temperature setting. If the current temperature setting is at S9 and if a slide motion is detected between the proximity sensors from S1 to S3, the current temperature setting would be increment by one temperature setting to S10. If a slide motion were detected from the proximity sensors from S5 to S3 to S1, then a current temperature reading of S10 would be decremented by 2 temperature settings to S8.

FIG. 9 illustrates a five position rotary slide switch such as a blower motor switch which uses five proximity switches and five LEDs. The five positions of the rotary slide switch are represented by an Off state, Low state, Medium Low state, Medium High state, and High State. Each proximity sensor represents one of the corresponding states. Furthermore, a respective LED is associated with a respective proximity sensor. Each LED has an ON output and an OFF output. Upon power up, rotary slide switch will default to the OFF state. When in the Off state, a first LED associated with the OFF proximity sensor will be illuminated. As the slide switch is transitioned from the OFF state to a desired state, a corresponding proximity sensor will be activated. The corresponding LED associated with the activated proximity sensor will be illuminated ON and all other LEDs will be illuminated OFF. A thumper signal will be provided upon each change of state.

FIG. 10 illustrates a flow chart for controlling a vehicle accessory using a proximity sensing unit. In step 40, a plurality of proximity sensors is provided for sensing a object in close proximity to the sensors. The plurality of sensors is arranged in a sequential pattern. A manual activation of the sensing unit is generated by holding an object (i.e., a finger) in close proximity to the sensors, in step 42. When each of the sensors detects the presence of the object, each proximity sensor will provide an activation signal to a controller, as in step 44. The controller identifies the received activation signal from the proximity sensors as a manual activation of the sensing unit for controlling a vehicle accessory (i.e., temperature control). The controller will then determine an activation sequence of the activation signals received from the proximity sensors in step 46. The sequence of the activation signals from the proximity sensors determines the control action for operating the vehicle accessory. For instance whether to increase or decrease an operating parameter of the vehicle accessory. Furthermore, depending on the number of proximity sensors have been activated and sequencing of those activation signals will also determine the magnitude of the operating condition. In step 48, the controller will select one of a plurality of control signals that is associated with the activation sequence of the proximity sensors. In step 50, the control action selected by the controller is initiated for controlling the operation of the vehicle accessory.

From the foregoing description, one ordinarily skilled in the art can easily ascertain the essential characteristics of this invention and, without departing from the spirit and scope thereof, can make various changes and modifications to the invention to adapt it to various usages and conditions. For example, more or less proximity sensors and LEDs may be utilized with a given proximity control unit as well as the directional arrangement of the proximity sensors and LEDs. Furthermore different sensors such as a piezo-electric sensor or other types of sensors may be utilized without departing from the scope of the invention thereof.

What is claimed is:

1. A method of operating a proximity sensing unit for controlling an accessory device of a vehicle, said method comprising the steps of:

providing a plurality of proximity sensors disposed in a sequential pattern within a sensing unit said proximity sensors being responsive to a manual activation.

receiving at least two activation signals from at least two proximity sensors in response to said manual activation;

determining an activation sequence of said at least two activation signals;

selecting one of a plurality of control actions associated with said activation sequence; and initiating said control action for controlling an operation of said accessory device.

2. The method of claim 1 wherein said activation sequence of said at least two proximity sensors correspond to a directional motion of said manual activation.

3. The method of claim 2 wherein said directional motion comprises a first directional motion that correlates to said one of said plurality of control actions for incrementing an operating parameter of said accessory device.

4. The method of claim 2 wherein said directional motion comprises a second direction dynamic motion that correlates to said one of said plurality of control actions for decrementing an operating parameter of said accessory device.

5. The method of claim 2 wherein at least one LED is illuminated in response to said manual activation.

6. The method of claim 1 wherein said control unit is a temperature control unit for controlling said accessory device.

7. The method of claim 6 wherein said control action comprises an adjustment command to increase a current temperature setting.

8. The method of claim 6 wherein said control action comprises an adjustment command to decrease a current temperature setting.

9. The method of claim 1 wherein said activation sequence comprises two proximity sensors activated simultaneously.

10. The method of claim 1 further comprising a step of illuminating at least one LED embedded within a surface of said proximity sensing unit for indicating said activation of at least one proximity sensor.

* * * * *